3,557,147
1-PHENYL-3-PHTHALANCARBOXYLIC ACIDS
Francis J. Petracek, Agoura, and Nobuyuki Sugisaka, Canoga Park, Calif., assignors, by mesne assignments, to Riker Laboratories, Inc., Northridge, Calif., a corporation of Delaware
No Drawing. Filed Nov. 29, 1968, Ser. No. 780,168
Int. Cl. C07d 5/40
U.S. Cl. 260—343.3                       1 Claim

ABSTRACT OF THE DISCLOSURE 1-phenyl-3-phthalancarboxylic acid final products and and the 1,4-dihydro-1-phenyl-3H-2-benzopyran-3-one, 4-bromo-1,4-dihydro-1-phenyl-3H-2-benzopyran-3-one and 4-chloro-1,4-dihydro-1-phenyl-3H-2-benzopyran-3-one intermediates obtained in their synthesis. The final products possess antipyretic and anti-inflammatory activity.

This invention relates to compositions of matter classified in the art of chemistry as substituted phthalans and to intermediates obtained in the synthesis thereof.

The invention sought to be patented, in its final product composition aspect, is described as residing in the concept of a chemical compound having a molecular structure wherein there is attached to the phthalan nucleus at the 1-position a phenyl radical and at the 3-position a carboxy radical.

The invention sought to be patented, in a first intermediate composition aspect, is described as residing in the concept of a chemical compound having a molecular structure wherein there is attached to the 1,4-dihydro-3H-2-benzopyran-3-one nucleus at the 1-position a phenyl radical.

The invention sought to be patented, in a second intermediate composition aspect, is described as residing in the concept of a chemical compound having a molecular structure wherein there is attached to the 1,4-dihydro-3H-2-benzopyran-3-one nucleus at the 1-position a phenyl radical and at the 3-position a bromine atom.

The invention sought to be patented, in a third intermediate composition aspect is described as residing in the concept of a chemical compound having a molecular structure wherein there is attached to the 1,4-dihydro-3H-2-benzopyran-3-one nucleus at the 1-position a phenyl radical and at the 4-position a chlorine atom.

Infra-red and ultra-violet spectral analysis, Nuclear Magnetic Resonance data, and elemental analysis of the tangible embodiments of this invention in both its final product and intermediate composition aspects, taken together with the nature of the starting materials and mode of synhesis, positively confirm the structure of the compounds sought to be patented.

The tangible embodiments of this invention, in its final product composition aspect, possess the inherent applied use characteristics of possessing significant pharmacological activity, without adverse toxicity, as antipyretic and anti-inflammatory agents. For example, 1-phenyl-3-phthalancarboxylic acid, which has been found to have an oral $LD_{50}$ in rats of $>1000$ mg./kg., compares favorably with the known anti-inflammatory agents indomethacin and prednisolone in inhibiting the development of carrageenin-induced edema in the rat, and in addition demonstrates a mild effect in reducing an induced hyperpyresis in rats.

The tanglible embodiments of this invention, in its final product composition aspect, also possess the inherent applied use characteristics of being useful in the preparation of substituted 1-phenyl-3-phthalanmethylamines, such as are disclosed and claimed in copending application Ser. No. 701,132 entitled "Substituted Phthalans and Intermediates," which was filed on Jan. 29, 1968 and is now U.S. Pat. No. 3,471,519, by the process described in our copending application Ser. No. 780,169 entitled "Process for the Preparation of 1-Phenyl-3-Phthalanmethylamines," filed concurrently herewith.

The tangible embodiments of this invention, in its intermediate composition aspects, possess the inherent applied use characteristics of being useful in the preparation of the tangible embodiments of this invention in its final product composition aspect by means of the reaction sequence hereinafter disclosed.

The manner and process of making and using the invention will now be generally described so as to enable one skilled in the art of chemistry to make and use the same as follows:

The following reaction sequence is illustrative of the preparation of the tangle embodiments of this invention in both its intermediate and final product composition aspects:

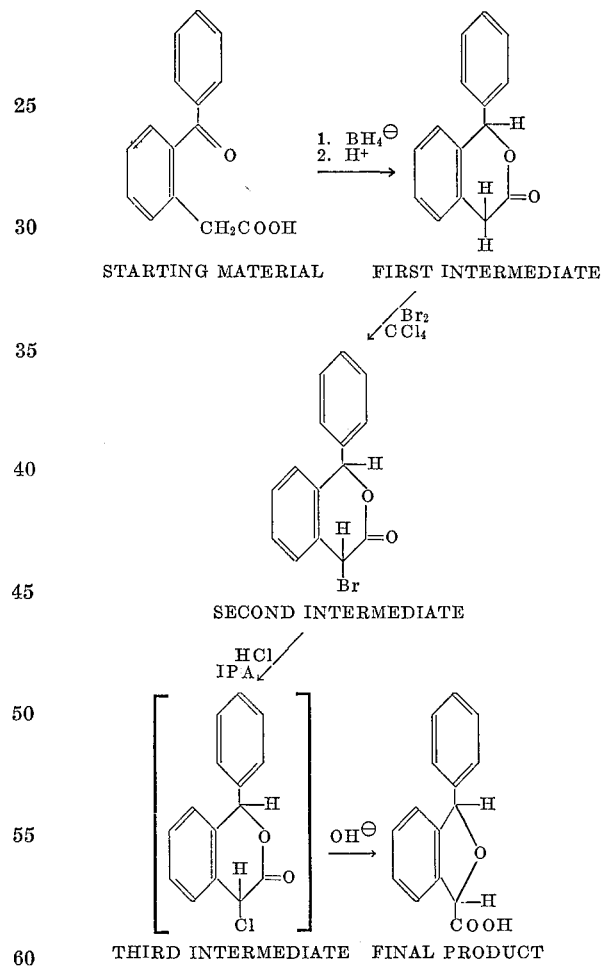

The starting materials for the preparation of the tangible embodiments of this invention are 2-benzoylphenylacetic acids that are conveniently prepared, as described by S. Nizamuddin et al., J. Indian Chem. Soc. 42(8): 569–70(1965), from 1-phenylindan-1-ol by treatment with chromium trioxide in the presence of acetic acid.

In carrying out the above-described reaction sequence starting materials may be employed wherein the benzene ring of the benzoyl radical and/or the benzene ring of the phenyl acetic acid, at all positions except that para to the acetic acid radical in the case of lower alkoxy substitution may be optionally substituted by one or more lower alkyl, lower alkoxy, halo or trifluoromethyl substituents. Such starting materials are prepared from similarly substituted 1-phenyl-indan-1-ols by the same procedure as that used to obtain the specific 2-benzoylphenylacetic acid depicted in the above-described reaction sequence. Their use yields intermediate and final products bearing corresponding substitution. Such intermediates and final products are the full equivalents of and have the same utility as the specific intermediates and final products depicted hereinabove and are included within the scope of this invention.

The 1-phenyl-3-phthalancarboxylic acid final product and halo-substituted 1,4-dihydro-1-phenyl-3H-2-benzopyran-3-one intermediate compositions according to this invention are capable of existing both as trans- and cis-isomers. Both isomeric forms are included within the scope of the tangible embodiments of this invention.

According to the reaction sequence depicted above, the starting material is converted to the tangible embodiments of this invention, in its first intermediate composition aspect, by means of a two step reaction in which the carbonyl function of the benzoyl moiety is first reduced and then lactone formation induced by ring closure. The two steps in the reaction are carried out consecutively without isolation of the reduction product. The reduction is carried out in aqueous base using a borohydride reducing agent such as, for example, sodium borohydride, potassium borohydride and the like. After reduction is completed, the reaction product is treated with a mineral acid such as for example, hydrochloric acid, which decomposes the excess borohydride reducing agent and brings about lactone formation, through ring closure, to yield the 1,4-dihydro-1-phenyl-3H-2-benzopyran-3-one intermediate.

The tangible embodiments of the invention, in its first intermediate composition aspect, are converted to the tangible embodiments of the invention, in its second intermediate composition aspect, by treatment in an equimolar ratio with bromine in the presence of an inert solvent such as, for example, carbon tetrachloride. The reaction is carried out at the reflux temperature of the solvent used, and the 4-bromo-1,4-dihydro-1-phenyl-3H-2-benzopyran-3-one intermediate is obtained by conventional techniques of isolation and purification.

The tangible embodiments of the invention, in its second intermediate composition aspect, are converted to the tangible embodiments of the invention in its third intermediate composition aspect by refluxing with hydrochloric acid in the presence of isopropanol. The chlorolactone product of the reaction, may, if desired, be isolated, but can be used without further purification in the next step of the reaction sequence.

The 1-phenyl-3-phthalancarboxylic acid final products according to the present invention are obtained from the 4 - chloro - 1,4-dihydro-1-phenyl-3H-2-benzopyran-3-ones comprising the tangible embodiments of the invention, in its third intermediate composition aspect, by reaction with a strong base such as, for example, sodium hydroxide, the reaction being carried out at room temperature. The product is recovered by conventional techniques of isolation and purification.

The tangible embodiments of this invention, in its final product composition aspect, can be combined with conventional pharmaceutical diluents and carriers to provide such dosage forms as tablets, suspensions, solutions, suppositories and the like.

The individual unit dosage and frequency of administration is determined not only by the nature and severity of the inflammatory condition for which the subject seeks relief, but in addition upon age, weight, and species of subject, its underlying physical condition and the route of administration. It will, accordingly, be within the judgment and skill of the practitioner administering the drug to determine the exact amount to be administered so as to be non-toxic, yet pharmaceutically effective in providing relief from the inflammatory condition.

The best mode contemplated by the inventor for carrying out the invention will now be set forth as follows:

EXAMPLE 1

(a) 1,4-dihydro-1-phenyl-3H-2-benzopyran-3-one

To 2-benzoylphenylacetic acid (10 g., 0.041 mole) dissolved in dilute sodium hydroxide (100 ml.) was added with stirring solid sodium borohydride reducing agent (1.6 g.). After stirring for two hours at room temperature, ice was added to the mixture and the excess sodium borohydride decomposed by the addition of 6 N. hydrochloric acid to pH 1. The resulting oil was extracted with ether (300 ml.). In order to promote lactone formation, the ether layer was not washed free of acid. The ether extract was evaporated in vacuo to an oil. The product, 8.1 g., M.P. 73°–74° C., was recrystallized from ethanol after initial crystallization from ethanol/water.

Analysis.—Calcd. for $C_{15}H_{12}O_2$ (percent): C, 80.33; H, 5.39. Found (percent): C, 80.18; H, 5.49.

(b) 4-bromo-1,4-dihydro-1-phenyl-3H-2-benzopyran-3-one

To the lactone (4.5 g., 0.02 mole) dissolved in carbon tetrachloride (25 ml.) at room temperature was added all at once an equimolar ratio (1 ml.) of bromine. The reaction mixture was refluxed for 20 minutes at which time hydrogen bromide evolution ceased. The solution was evaporated to a viscous oil from which the product, M.P. 98°–103° C., was crystallized in methanol.

Analysis.—Calcd. for $C_{15}H_{11}BrO_2$ (percent): C, 59.42; H, 3.65; O, 10.55. Found (percent): C, 57.70; H, 3.77; O, 10.45.

(c) 4-chloro-1,4-dihydro-1-phenyl-3H-2-benzopyran-3-one

A mixture of the bromolactone (6.7 g., 0.022 mole), 6 N. hydrochloric acid (35 ml.) and isopropanol (70 ml.) were refluxed for one hour. Evaporation to near dryness and extraction with ether gave 5.7 g. of a brown oil which was used in the next step of the reaction sequence without further purification or isolation.

(d) 1-phenyl-3-phthalancarboxylic acid

The crude chlorolactone before evaporation of the ether is treated by stirring with 6 N. sodium hydroxide (50 ml.) for 30 minutes at room temperature. The reaction mixture is then diluted with water and the resulting basified water layer acidified the 6 N. hydrochloric acid. The crystalline acid product, 6.9 g., M.P. 149°–157° C., was recovered by filtration. Recrystalliation from chloroform gave white needles, M.P. 166°–170° C.

Analysis.—Calcd. for $C_{15}H_{12}O_3$ (percent): C, 74.99; H, 5.03. Found (percent): C, 74.76; H, 5.06.

The following example illustrates the pharmacological effectiveness of the tangible embodiments of this invention in its final product composition aspect in the treatment of inflammatory conditions.

EXAMPLE 2

(a) An acute toxicity determination was made of the 1-phenyl-3-phthalancarboxylic acid prepared in the foregoing Example 1 in accordance with standard pharmacological test procedures and revealed that the $LD_{50}$ in mice following intraperitoneal administration was 600 mg./kg. and in rats following oral administration was >1000 mg./kg.

(b) The antipyretic activity of the compound was determined by administering the compound to rats in which a hyperpyretic state had been induced by means of the subcutaneous administration of brewers yeast. A dose of 250 mg./kg. administered by intubation was found to reduce the induced hyperpyresis by 60 percent. This demonstrates a mild antipyretic activity when compared with sodium salicylate which at a dose of 100 mg./kg. administered by intubation reduces an induced hyperpyresis by 80 to 100 percent.

(c) The effect on carrageenin-induced edema in the hind paw of the rat was determined by the method of Winter et al., Proc. Soc. Exptl. Biol. & Med. 111:544–547 (1962) and compared to that produced by indomethacin. The compound according to the present invention at a dose of 300 mg./kg. administered by intubation inhibited the development of edema by 78 percent and a dose of 150 mg./kg. by 33 percent. This compares favorably with indomethacin which causes a 55 percent inhibition at a dose of 3 mg./kg.

The subject matter which the applicant regards as his invention is particularly pointed out and distinctly claimed as follows:

1. 1-phenyl-3-phthalancarboxylic acid.

References Cited

UNITED STATES PATENTS 3,103,515   9/1963   Zaugg et al. _____ 260—343.3

ALEX MAZEL, Primary Examiner

ANNE MARIE T. TIGHE, Assistant Examiner

U.S. Cl. X.R.

260—343.2, 469; 424—279